[72] Inventor Didier Leonard
Boulogne, France
[21] Appl. No. 750,986
[22] Filed Aug. 7, 1968
[45] Patented Dec. 28, 1971
[73] Assignee C. I. T. Compagnie Industrielle des Telecommunications
[32] Priority Aug. 11, 1967
[33] France
[31] 117,836

[54] DUPLEX RADIOCOMMUNICATION EQUIPMENT

17 Claims, 4 Drawing Figs.

[52] U.S. Cl. 343/179, 325/55
[51] Int. Cl. H04b 1/50
[50] Field of Search 343/175, 177, 179; 325/51, 55, 57

[56] References Cited
UNITED STATES PATENTS

| | | | |
|---|---|---|---|
| 3,535,689 | 10/1970 | Oden | 325/15 |
| 3,210,665 | 10/1965 | Street | 325/55 |
| 3,428,899 | 2/1969 | Sekimoto | 325/55 |

*Primary Examiner*—Robert L. Griffin
*Assistant Examiner*—Anthony H. Handal
*Attorney*—Craig, Antonelli & Hill

ABSTRACT: A duplex radiocommunication transceiver with carrier frequencies that are made available to all parties of a network comprises a generator providing a plurality of pairs of frequencies and which is equipped with a stepping switch, a coder for coding the address of a correspondent, means for transmitting an occupation frequency in a channel which is occupied, means for decoding an address code being received, means for interpreting the presence of the occupation frequency, and means for stopping said stepping switch if both frequencies of the concerned pair are free for both parties.

DUPLEX RADIOCOMMUNICATION EQUIPMENT

This invention relates to transceivers for use in duplex radio connection. A transceiver is a radio set capable of being used as a transmitter and as a receiver. More particularly the invention is concerned with providing duplex radio telephone connections between two parties of a network by means of carrier frequencies made available to all parties taking part in the network. The network may have a variable configuration, since certain parties may be mobile, for example, vehicles or aircraft.

Conventional duplex radio point-to-point connection between two parties X and Y requires the allocation to each of the parties of a fixed carrier frequency. As each party has a unique carrier frequency which is not available to any of the other parties, a large number of carrier frequencies corresponding to the number of parties must always be provided for a duplex network.

An object of the present invention is the provision of a transceiver which may be used to provide duplex connections in a network to which are allocated fewer frequencies or lines than the number of parties of the network.

In accordance with the present invention there is provided a transceiver for use in a network in which individual transceivers are identified by unique codes and N-lines are available for carrying traffic between the transceivers which are each adapted to communicate with one another through any of the duplex radio links which are free, the transceiver comprising: a variable coder for producing a code of a selected transceiver with which a duplex link is to be established; a fixed decoder for recognizing on an incoming signal after passage through a heterodyne receiver a code significant of the identity of the transceiver being called; a frequency generator providing $N/2$ frequency pairs spaced by $N/2$ frequency ranges, the two frequency ranges of each pair characterizing two lines available for one duplex connection; a device for conducting a step-by-step exploration of the frequency pairs; first means for checking the utilization of the two frequencies of a pair at each step of the exploration; and second means for stopping the exploration if both of the two frequencies of a pair are available to establish a new duplex link.

With the transceiver of the invention a connection of interest to a particular party in a network is not denoted by a predetermined specific frequency in a frequency band assigned to the network, but can occupy any position in the band. The sole requirement of the pair of frequencies selected for establishing a duplex link is that neither of them is already in use in the network at the moment that communication is established.

In operation of the transceiver, the stepping mechanism carries out a continuous monitoring of the pairs of frequencies provided to the network and each of the frequencies is examined by the fixed decoder to ascertain whether any of the frequencies carries the call sign or code of the transceiver which is in its waiting or quiescent condition. If one of the frequencies or lines is identified as being an attempt to establish a duplex link with the transceiver, the transceiver responds by answering on the other frequency of the pair. The pairs of frequencies for the different transceivers of the network are identical and any of the transceivers can call any of the others on any free pair of frequencies allocated to the network.

An important advantage of the invention is that it enables the number of duplex connections or pairs of frequencies allocated to a network to be a function of the traffic density likely to be experienced in the network For example, in a network having 2 hundred parties it can be shown statistically that under given conditions of very general application there are, in actual practice, rarely more than seven duplex connections operating at the same time. In other words, only 7 percent of the available capacity of the network is likely ever to be used. Consequently, the effective utilization of the frequency band assigned to the network if each party is to have a unique frequency is low. If 100 percent utilization of the system is aimed at under the same conditions as results in the 7 percent utilzation of a conventional duplex network, the system of the invention is capable of providing with the same number of duplex connections, that is to say 100, duplex connections between 2,860 parties to the network. This represents a considerable economy in the number of lines allocated to the network as compared with prior art proposals.

Suitably, the transceiver includes line-engaged means for modulating an outgoing transmission with a characteristic signal signifying that the frequency of transmission is in use but which is not detected by the called party. This result may be obtained, for example, by modulating the transmission continuously with an audio frequency signal which is above the normal range of speech frequencies. The receiving transceiver may then be arranged to include circuitry which responds to the absence of the continuous audio signal on a particular frequency being listened to, by signifying the availability of the line of that frequency for duplex connection.

The coder of the transceiver preferably modulates an outgoing transmission with a code significant of the identity of the transceiver with which communication is to be established, the method of modulating the transmission by the coder being different from the method of modulation employed for transmitting information through the established duplex connection. For example, the speech frequencies of the established connection may be transmitted in the form of a frequency-modulated carrier whereas code signal is transmitted as an amplitude modulation of the carrier.

The invention will now be described in more detail, by way of example, with reference to the accompanying drawings, in which:

FIGS. 1*a* and 1*b* are schematic diagrams of a pair of transceivers X and Y operating, respectively, as a transmitter and a receiver;

Figures 1A, 1B:
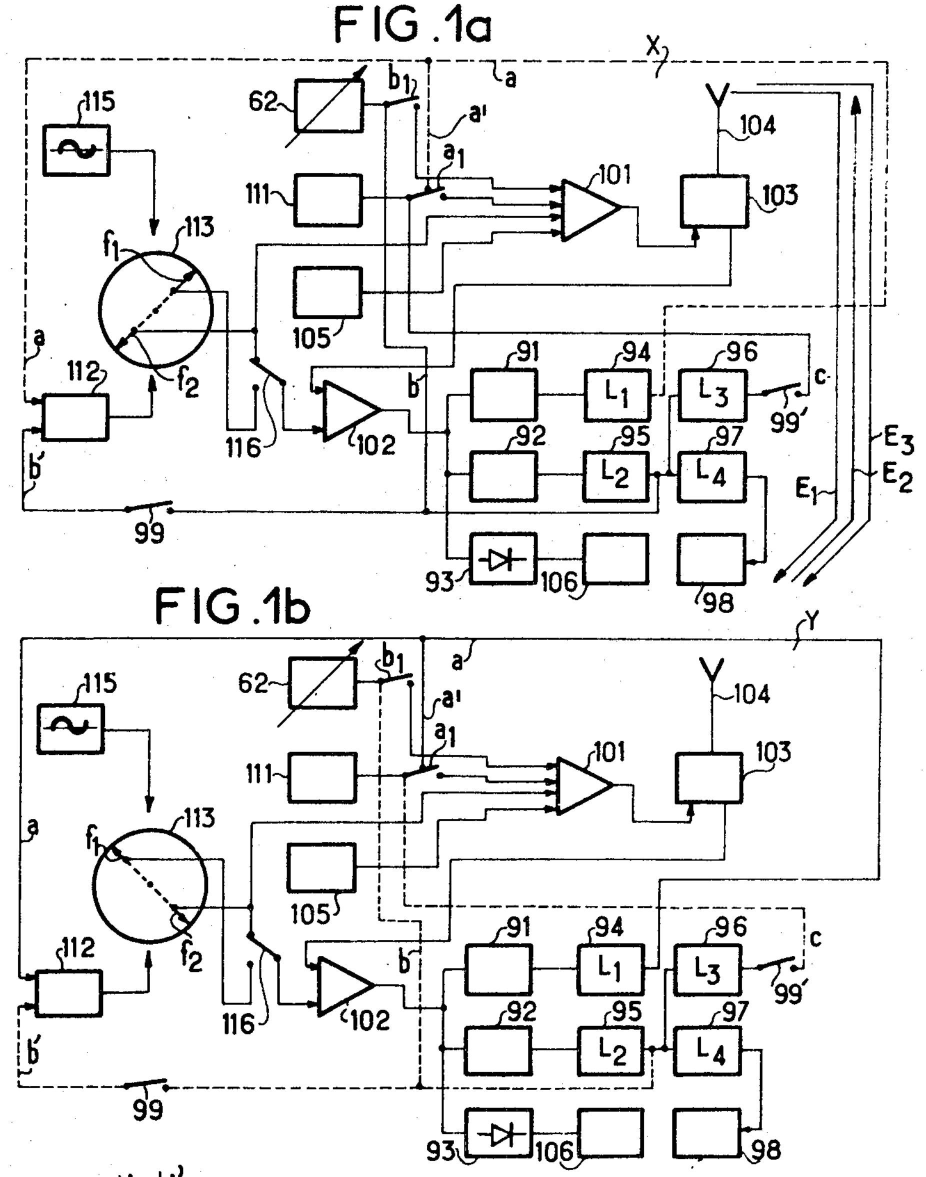

The transceivers X and Y shown in FIGS. 1*a* and 1*b* are essentially identical although the functioning of their circuitry is not the same when operating as a transmitter and as a receiver. For the sake of clarity the two diagrams have been drawn with indications in each of them of the specific circuits which are functioning, FIG. 1*a* showing a transceiver set in the transmitting condition whereas FIG. 1*b* shows a transceiver set in the receiving condition. In each of the transceiver sets X and Y the connections effectively in service have been indicated in solid lines and the connections which may exist but which are not effectively in service have been indicated in dotted line. In the two sets the same components have been given the same reference numerals for the sake of simplicity of description.

Each set comprises a radio transmitter 101, a radio receiver 102 operating on the heterodyne principle, a duplexer 103 and a common antenna 104. The output of the transmitter 101 can be modulated with audio frequency signals from a microphone 105. At the output of the receiver 102, a detector 93 detects the audio frequency signals $f_r$, and applies them to an earpiece 106. Normally the microphone 105 and the earpiece 106 will form parts of a telephone handset in each transceiver.

The transmission from the transmitter 101 can also be modulated by a variable coder 62. In order to call Y, X makes up Y's code with the coder 62. The transmission can alternatively be modulated with a fixed frequency $f_o$, hereinafter referred to as the "engaged tone" and supplied by an oscillator 111.

A signal generator 115 providing very precise and stable frequencies grouped in pairs $f_1, f_2$ is connected to supply them to respective spaced pairs of diametrically opposite positions on a rotary commutator 113 having two sliding contacts aligned on a diameter and driven by a stepping device 112 to select, in turn, different pairs of frequencies $f_1, f_2$. One sliding contact extracts a frequency $f_1$ of a frequency pair from the commutator and the other the frequency $f_2$ of the pair. The frequencies $f_1$ and $f_2$ are applied alternatively by a changeover switch 116 to the heterodyne receiver 102 which passes received transmissions at frequencies spaced by $f_1$ or $f_2$ from the heterodyne intermediate frequency. The changeover switch 116 is a bipolar inverter which is synchronized in operation with the stepping device and applies each of the frequencies $f_1, f_2$, in turn, to the receiver 102 for each position of the stepping device 116. The frequency $f_2$ is also applied to the transmitter 101.

The receiver 102 feeds its output, in parallel, to the audio frequency detector 93; a decoder 91 which identifies the local code of the receiver 102 received on the incoming transmission, for example code X for set X and code Y for set Y; and, a detector 92 which senses that the incoming transmission is being modulated by the engaged tone $f_o$.

The decoder 91 operates a logic circuit 94 which, via a line *a*, *a'*, control the closing of a contact $a_1$ to feed the engaged tone $f_o$ to the transmitter 101, and also stops the stepping device 112.

The detector 92 of the engaged tone $f_o$ operates, selectively, a logic circuit 95, a logic circuit 96 and a logic circuit 97. When the set is in the transmission condition shown in FIG. 1*a*, the logic circuit 95 controls via a line *b*, *b'*, the engagement of a contact $b_1$ of the coder 62 and stops the stepping device 112 if switch 99 is closed. In the same condition of the set the logic circuit 96 controls through a line *c* the engagement of the contact $a_1$ mentioned above, if switch contact 99' is closed. The logic circuit 97 controls a general return-to-zero device 98 when the set is in the receiver condition of FIG. 1*b*. The stepping device 112 receives a stop signal through the line *b'* only if the telephone handset 105 is unhooked. If this is not the case, the switch contact 99 open-circuits line *b'* and the order to stop is not transmitted to the device. In the same way, line *c* is open-circuited by the switch contact 99' if the telephone handset is hung up, and is completed if the telephone handset is unhooked.

The two transceiver sets operate together as follows, each successive stage in the operation being denoted by a separate paragraph.

In the watching state, with the two telephone handsets hung up, the two stepping devices are energized and the rotary commutators having the two sliding contacts 113 each carry out an exploration of the pairs of frequencies $f_1$ and $f_2$ for an indefinite period. In all of the sets, which are identical to each other, $f_1$ is the frequency selected for reception and $f_2$ is the frequency selected for transmission. Once voice communication is established the frequency transmitted by X (frequency $f_2$ of X) is called $f_X$, and the frequency transmitted by Y (frequency $f_2$ of Y) is called $f_Y$.

If the operator at set X wishes to call the operator of set Y, he unhooks his handset and dials Y's number, which is memorized in a memory device, not illustrated in the drawings 1*a* and 1*b*. The operation of the stepping device 112 will now be considered. At the first position of the stepping device for which the frequencies $f_1$ and $f_2$ are both free, no frequency $f_o$ is received by X and the logic circuit 95 stops the stepping device 112. The frequency $f_2$ is applied to the transmitter 101 of set X. This position of free frequencies may be encountered from any starting position whatsoever, irrespective of the position occupied by the commutator at the moment the operator set X unhooked his handset to set in operation the search for a pair of free frequencies.

The logic circuit 95 of set X closes the contact $b_1$ to apply the code of set Y as modulation to the transmission of set X at its frequency $f_2$, named $f_X$ hereafter, this modulated transmission corresponding to the transmission direction $E_1$ in FIG. 1*a*.

Meanwhile exploration continues in set Y and stops at the position of the commutator 113 at which the code of set Y on an incoming transmission is received. This, of course, occurs when the incoming signal of frequency $f_2$ from set X is received. The logic circuit 94 then stops the stepping device 112 via the line *a* and applies modulation by the engagement tone $f_o$ via the line *a* and the contact $a_1$ to the frequency $f_Y$ emitted by Y (direction of emission $E_2$).

In set X, the carrier frequency $f_Y$ modulated by $f_o$ is received by the detector 92, and, via the line *c*, the logic circuit 96 controls the modulation of $f_X$ by the engagement tone $f_o$ (direction of transmission $E_3$) which now takes the place of the call sign code of set Y formerly modulating the transmission of set X.

In set Y, the modulating engagement tone $f_o$ is received at the carrier frequency $f_X$.

Under these conditions conversation may be established between sets X and Y, set X using voice modulation on $f_Y$ frequency and set Y using voice modulation on $f_X$ frequency. The frequency $f_o$ is always received, but is inaudible in the earpieces of the handsets.

At the conclusion of the conversation, both parties replace their handsets and the two sets are returned to the waiting condition of stage 1.

It may transpire, however, that party Y does not answer party X's call, although conditions are in principle good: for instance, the operator of set may be absent. If party X, abandoning his call, replaces his handset, set X returns to zero. If, however, set Y cannot return to zero as the handset has not been replaced, the logic circuit 97 of set Y takes over as follows: the disappearance of the engaged tone signal $f_o$ at the input of the logic circuit 97 has the effect of actuating the return to zero of control 98.

Figure 2:
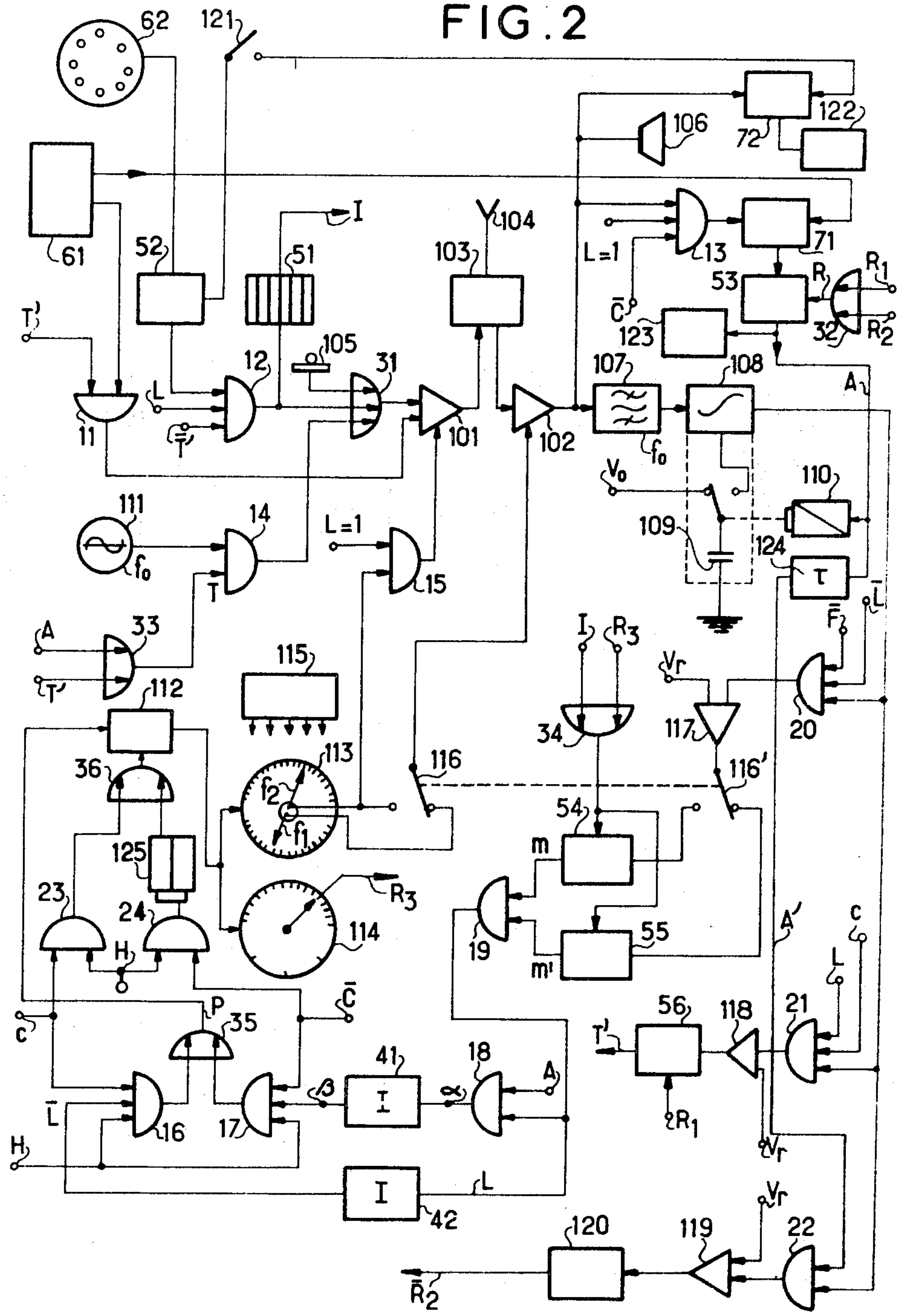
FIG. 2 is a more detailed diagram of one of the transceivers.

FIG. 2 is a more detailed diagram of a transceiver. It comprises a transmitter 101 and a receiver 102 connected to a common antenna 104 by way of a duplexer 103. The transmitter 101 can be frequency modulated with audio signals from a microphone 105. It can also be frequency modulated by a generator 111 producing an engaged tone signal $f_o$. The engaged tone $f_o$ is advantageously a frequency lying just above the upperlimit of the vocal scale, for instance $f_o$=3,250 c./s.±150 c./s. for a vocal spectrum limited to 300–3,000 c./s. The receiver 102 feeds an earpiece 106 and also a logic chain starting with a high-pass frequency filter 107 centered on $f_o$, followed by a combined detector and integrator 108. A relay 110 is energizable to connect to the integrator 108 a load capacitor 109. In general, the microphone 105 and the earpiece 106 are disposed in a telephone handset.

Three threshold amplifiers are shown at 117, 118, 119. A monostable multivibrator 120 is connected to receive the output of threshold amplifier 119 in the lower right-hand part of the figure. Box 124 disposed beneath the relay 110 is a delay member while a bistable multivibrator is shown at 125 to the left of the commutator 113.

A generator 115 of N carrier frequencies is provided for the network to provide lines between N parties. A stepping device 112 enables two frequencies $f_1, f_2$ forming a pair to be extracted at each step from the commutator 113. It can be seen that the pairs of frequencies $f_1, f_2$ occupy $N/2$ ranges spaced over the frequency spectrum of generator 115 by $N/2$ intervals. This situation is represented by rotary commutator 113 having a first flat circular coil and two sliding contacts occupying diametrically opposed positions. A second flat coil 114 with one sliding contact only and having N points, is associated with the first flat coil and the instantaneous position of the sliding contact is disposed between two positions of engagement of the contacts on the flat coil 113.

The changeover switch 116 of FIG. 1 is shown as two contacts 116, 116' of a bipolar inverter which in each position of the stepping device 112 enables successive checking to be undertaken of the state of the two carrier frequency lines $f_1$ and $f_2$. Contact 116 applies carrier frequency $f_1$ and then $f_2$ to the input of the receiver 102. Contact number 116' injects into a memory 55 a signal received corresponding to $f_1$, or injects in memory 54 a signal received corresponding to $f_2$. Also shown are a call button 121 in the top left corner of the figure; a visible indicator 122 in the right-hand corner; a call-signalling device 123; AND-gates 11 to 24; OR-gates 31 to 36; inverters 41, 42; a prepositioning counter 51; memories 52 to 56; address coders 61, 62 of which 61 is a fixed local address coder for X, and 62 is an adjustable coder, for instance a telephonic dial, to give an external address code Y; and decoding comparators 71 and 72 of which comparator 71 makes a comparison of a code received with the local address code and comparator 72 compares a code received with a dialed external address held temporarily in the memory 52.

The counter 51 is prepositioned with a number of calls sufficient for the stepping device of the set called to have explored the N positions of its commutator with a margin of safety, for instance 110 calls for N–100.

The memory 52 registers the address code of the called party supplied for instance by the telephonic dial 62.

The memory 53 registers coincidence in the comparator decoder 71 of a code received from an incoming call via receiver 102, with the local address code held in the fixed address coder 61.

The memory 54 registers a signal supplied by the threshold amplifier 117 when energized by the integrator 108 on reception of a frequency $f_1$ forming part of a pair of frequencies $f_1$, $f_2$, modulated by the engaged tone frequency $f_o$. The memory 54 supplies a signal $m$=1 if the line $f_1$ is free. The memory 55 fulfills the same service on reception of the other frequency, $f_2$ of the pair of frequencies, and supplies a signal $m'$=1 if the line $f_2$ is free.

The memory 56 registers the existence of the engaged tone frequency $f_o$ detected by the integrator 108 of the calling party, in conditions which will be defined below.

The installation makes use of the following logic signals:

A. (at the output of the memory 53) call registered. $A$=1 signifies that at the set of the called party a code received has been found identical to the local address code by the decoder 71.

L. (at the output of the AND-gate 19 located at the output sides of the memories $m$, $m'$) signal of line. $L$=1 signifies that the two lines of a pair of frequencies, respectively $f_1$, $f_2$, are free that is to say they do not carry an engaged tone frequency $f_o$ above the level of the threshold amplifier 117 of the integrator 108. The signal L is obtained at the output of the AND-circuit 19 supplied by the signal $m$ and $m'$. The role of the integrator 108 and of the threshold amplifier 117 is to provide adequate security in detection of conditions $m$=0 or $m'$=0. The threshold amplifier 117 receives the signal of the integrator 108 from the AND-circuit 20 for $\overline{L}$=1 and $\overline{F}$=1 (see below the role played F).

A'. (at the output of the delay circuit 124) $A'$=$A$ delayed by small element of time $\delta t$—follows the signal A for a certain fixed period corresponding approximately to the transit period for transmission/reception and detection.

C. (at the input of the AND-gate 21) position of the telephone handset, $C$=1 means that the handset is off the hook, $\overline{C}$=1 means that the receiver is still on the hook ($\overline{C}$ at the input of the gate 24).

T. (at the input of the AND-gate 14) traffic, $T$=1 signifies the transmission of the engaged tone frequency $f_o$ by the called party ($T$=$A$±$T'$).

T'. (at the input of the OR-gate 33) reply to the engaged tone frequency: $T'$=1 means that the calling party is now transmitting the engaged tone frequency. This signal is supplied by the memory 56 which receives the output signal of the integrator 108 for $C$=1 and $L$=1 at the input of the AND gate.

H. (at the input of AND-gates 16, 17, 23, and 24) timepiece signals. $H$=1 means the arrival of a timing pulse.

P. (at the output of OR-gate 35) exploration, $P$=1 means that the stepping device receives a pulse to advance. The signal P issuing from the OR-gate 35 comes either from the output of the AND-gate 16 for the calling party ($C$=1, with the handset off, H, $\overline{L}$=1, lines engaged) or from the output of the AND-gate 17 for a called party ($\overline{C}$=1, with the handset replaced, $H$ $\beta$=0 for $A$=1 and $L$=1). In actual fact one has $\alpha$=1 at the input of the inverter 41 for $A$=1, $L$=1, and therefore $\beta$=0 at the output of the inverter 41. In a calling party set, the stepping device moves forward if one of the lines explored is engaged. In a called party set, the stepping device stops if there are free lines and if a call is registered.

$R_1$ at OR-gate 32 is a signal for returning the memory 53 to zero, said signal being furnished by means of the replacement of the handset.

$R_1$ at OR-gate 32 is a signal for return-to-zero generated in the event of an abandoned call. This occurs if, in conditions allowing conversation to take place, the operator of set Y nevertheless does not take his receiver off and, at the end of a certain time, the operator of set X abandons the call. At this moment it is necessary for all the memories of set Y to return to zero but since the handset of set Y has not been unhooked, another signal is necessary for effecting this return-to-zero: the signal R takes charge of this. When the signal A appears from the memory 53 it energizes the relay 110 which connects to the integrator 108 the capacitor 109 previously charged by a direct voltage $V_o$ and brings the integrator 108 to saturation on the appearance of the signal A (some few milliseconds) in such a way as to simulate the existence of the engaged tone frequency $f_o$ which will be transmitted by the transmitter of the calling part X after a certain delay.

Figure 3:
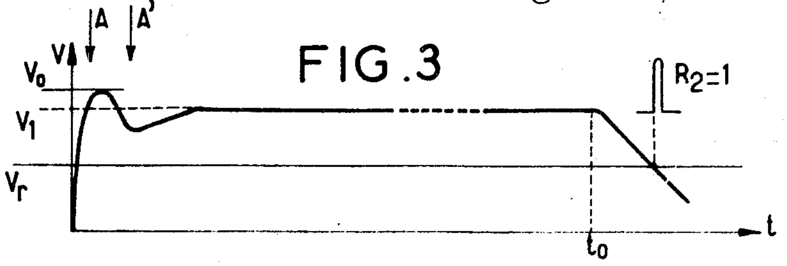
FIG. 3 is a graph illustrating the functioning of a part of the transceiver.

This process is illustrated in FIG. 3 where it can be seen that on the appearance of the signal A (some few milliseconds) the integrator 108 is charged with the voltage $V_o$. When the signal A' arrives (A delayed by $\delta t$), the integrator is now charged by the engaged tone frequency $f_o$ at a voltage $V_1$ slightly lower than $V_o$. If the calling party replaces his receiver at a point of time $t_o$, the integrator 108 discharges in accordance with its time constant, and when its voltage again coincides with a reference value $V_r$, the signal $R_2$ for return-to-zero is generated.

With reference again to FIG. 2, as the voltage of the integrator 108 has thus been carried very rapidly to a value greater than the reference value of the threshold amplifier 119, the result is that the monostable multivibrator 120 is deenergized and transmits a signal of logic value $R_2$=1 (where $R_2$=O), to provide the return-to-zero signal. When the handset of set X is hung up, the engaged tone frequency $f_o$ is no longer received by set Y, and the output level of the threshold amplifier 119 gradually drops and passes below the reference voltage value $V_r$. At this moment the trigger circuit provided by the monostable multivibrator 120 emits a pulse: this is the signal $R_2$=1 which operates the return-to-zero of the memory 53.

$R_3$ (from flat coil 114 to OR-gate 34). Return-to-zero of the memories 54 and 56 by the output of the flat coil 114 between each position of the sliding contacts on the commutator 113.

I (at the output of prepositioned counter 51). Saturation of the counter 51. $I$=1 means that the counter 51 has counted the number of prescribed calls.

The transmitter 101 can be modulated either by the code produced at 62 and stored in memory 52, for the condition $L$=1, $T'$=1 (12), or by the engaged tone frequency $f_o$ for the condition $T$=($A$+$T'$)=1 (14).

There can in addition be a supplementary modulation of the transmitter 101 (for instance modulation of the carrier amplitude, whereas the other modulations are for instance frequency modulations) in accordance with its local address injected by the fixed address coder 61 for the condition $T'$=1 (11). The usefulness of this supplementary modulation will be explained below.

The decoder 71 is energized by signals received for the condition $L$=1, $\overline{C}$=1 (13).

The memory 53 of the decoder is returned to zero by application of the signal $R$=($R_1$+$R_2$) (32).

The threshold amplifier 117 is energized by the output of the integrator 108 for $\overline{F}$=1, $\overline{L}$=$s$ (20).

The memory 54 is energized by the detection of the carrier frequency $f_1$ and the memory 55 by the detection of the carrier frequency $f_2$, by virtue of the functioning of the changeover switch or bipolar inverter 116–116' whose operation is synchronized with the stepping device 112 by means not illustrated. The memories 54 and 55 are returned to zero by the signal $I$+$R_3$ (34).

The signal T' is formed at the output of the memory 56 if the threshold amplifier 118 transmits the output signal of the detector/integrator 108: condition $C=1$, $L=1$ (21).

The signal $R_2$ (suppression of $\bar{R}_2$) can be formed at the output of the monostable multivibrator 120 when at the AND-gate 22 the call signal appears, slightly delayed by a few milliseconds ($A'=A$ delayed by $\delta t$).

The timing signals are transmitted to the stepping device 112 either for $\bar{L}=1$, $C=1$ (16), or for $\bar{C}=$ and $L\times A=1$ (17, 18 and 41).

The role of the AND-gates, 23, 24, OR-gate 36 and bistable multivibrator 125 is as follows: when the handset of the telephone set remains hung up for each pair of frequencies $f_1$, $f_2$, the equipment begins to function by checking whether the two lines are free and if the answer is in the affirmative, it effects the decoding code received. On the other hand, if the handset is off the hook, no decoding of the code received takes place. As the two operations of checking and decoding have the same duration, it is advantageous to effect the exploration at double speed when the handset is unhooked. For this reason the stepping device 112 receives timing signals directly at speed $v$ via 23 and 36 when the handset is unhooked ($C=1$), and by means of bistable multivibrator 125 at speed $v/2$ when the handset is in the hung up position ($\bar{C}=1$), the multivibrator 124 providing a divide-by-two circuit.

The functioning of the device described will be explained in detail systematically below:

The values adopted for the parameters are, by way of example, the following:

a. Number of frequencies $N=100$.
b. Capacity of the prepositioning counter 52:210.
c. Duration of checking utilization of a pair of frequencies: 80 ms.
d. Duration of decoding an address code: 80 ms.
e. Duration of an exploration step, with the handset hung up: 160 ms. (speed of exploration $v$).
f. Duration of an exploration step with the handset unhooked: 80 ms. (speed of exploration $v/2$.

In the description of the functioning of the device given below, the notation (mn) represents the content of the memory mn. (mn) O means that the memory mn is empty. (mn) + means that the memory mn has registered information.

The description is given in the form of tables for the calling party X and the called party respectively as it is considered that this form of presentation is advantageous for facilitating understanding of the invention.

I - WATCHING CONDITION

| Set X | Set Y |
|---|---|
| Headset hung up $C=1$ | Handset hung up $\bar{C}=1$ |
| Exploration speed $v/2$ | Exploration $v/2$ |
| Checking of the lines - decision to call | Checking of the lines - decision to call |
| Memories | Memories |
| (52) (53) (54) (55) (56) | (52) (53) (54) (55) (56) |
| 0 0 0 0 0 | 0 0 0 0 0 |

II - Y IS CALLED BY X

| Set X | Set Y |
|---|---|
| Handset unhooked $C=1$ | Handset in hung up position $\bar{C}=1$ |
| Exploration speed $v$ | Exploration speed $v/2$ |
| Checking of the lines - decision to call | Checking of the lines - decision to call |
| dialing address Y | |
| (52) + | |
| free lines located | |
| $m=m'=1$ $L=1$ | |
| Stopping of exploration | |
| Transmission of $f/2$ modulated by address Y 210 repetitions | |
| (52) (53) (54) (55) (56) | (52) (53) (54) (55) (56) |
| + 0 + + 0 | 0 0 0 0 0 |

III - CALL RECEIVED BY Y

| Set X | Set Y |
|---|---|
| | Handset in hung up position $\bar{C}=1$ |
| | Free Lines $L=1$ |
| | Decoding address Y $A=1$ |
| | (54) (53) (54) (55) (56) |
| | 0 + + + 0 |
| | Stopping of exploration |
| | Signalling |

IV - CONFIRMATION OF CALL

| Set X | Set Y |
|---|---|
| | Transmission of $f_1$ modulated by $f_0$ |
| Reception of $f_0$ transmitted by Y on $f_1$ | |
| (52) (53) (54) (55) (56) T'=1 | |
| + 0 + + + | |
| X transmits $f_0$ at $f_2$ | |
| | Y receives $f_0$ transmitted by X at $f_2$ |
| | $A'=1$ |
| | $\bar{R}_2=1$ |

V - CONVERSATION

| Set X | Set Y |
|---|---|
| $C=1$ | Y unhooks $C=1$ |
| X always transmits $f_0$ at $f_2$ | Y always transmits $f_0$ at $f_1$ |
| X speaks at $f_2$ | Y speaks at $f_1$ |
| (52) inhibited at T' | $T=1$ |
| | (52) (53) (54) (55) (56) |
| | 0 + + + + |
| X transmits its own address code at $f_2$(amplitude modulated) | Y transmits its own address code at $f_1$ (amplitude modulated) |

VI - END OF CONVERSATION

| Set X | Set Y |
|---|---|
| X replaces the handset $R_1 = 1$ | Y replaces handset $R_1 = 1$ |
| RAZ | RAZ |
| (54) (53) (54) (55) (56) | (52) (53) (54) (55) (56) |
| 0 0 0 0 0 | 0 0 0 0 0 |

VII - NO REPLY BY Y TO X's CALL AT $f_2$
(Variant of III)

| Set X | Set Y |
|---|---|
| (52) (53) (54) (55) (56) | Y does not transmit, as is within the radiation pattern of a third party (C) Conversing with a fourth party (D) at $f_1/f_2$ |
| + 0 + + 0 | |
| X changes channel at the end of 210 calls | |
| $I=1$ | $L=0$ |
| I empties 54 and 55 | Parties (C) and (D) being both beyond the range of X who does not appreciate their presence. |
| (52) (53) (54) (55) (56) | |
| + 0 0 0 0 | |
| Exploration speed $v$ (see II). | |

VIII - NO REPLY BY Y
(Variant of IV)

| | Set X | Set Y |
|---|---|---|
| Checking the traffic of Y: | | |
| Call button 121 closed $F=1$ | | |
| Decoding of code Y: | $L=0$ | |
| The lighting of the indicator 122 if Y is transmitting. | | |
| Checking engagement prohibited ($F=0$) | | |

IX - ABANDONMENT OF THE CALL

| Set X | Set Y |
|---|---|
| | (52) (53) (54) (55) (56) |
| | 0 + + + 0 |
| X replaces handset $R_1 = 1$ | Y does not reply $\bar{R}_2=0$ |
| | $R_2=1$ |
| (52) (53) (54) (55) (56) | RAZ |
| 0 0 0 0 0 | (52) (53) (54) (55) (56) |
| | 0 0 0 0 0 |

The equipment contains a certain number of devices adapted to increase its reliability.

1. The presence of the engaged tone $f_0$ is not detected by a simple detector circuit, but by a detector/integrator associated with a threshold amplifier, so as to avoid interpreting a parasitic frequency as an engaged tone frequency.

A duration-selecting means (integrator 108) and an amplitude-selecting means (threshold amplifiers 117, 118, 119) are associated with a frequency-selecting means (narrow band filter 107 of FIG. 2).

An interval of 80 ms., which is the duration allocated to the detection of two free frequencies of a pair, $f_1, f_2$ is subdivided into eight elementary intervals each of 10 ms. by means of timing signals at a rhythm of 10 kc./s. and a logic circuit comprising essentially a counter having three binary trigger circuits and a diode matrix. The various elementary intervals are allocated individually to the following operations:

1. Return to zero of the integrator 108.
2. Charging the integrator by $f_1$.
3. Charging the integrator by $f_1$, reading, storing in memory 55.
4. Charging the integrator by $f_1$, reading, storing in memory 55.
5. Return to zero of the integrator.
6. Charging the integrator by $f_2$.
7. Charging the integrator by $f_2$, reading, storing in memory 54.
8. Charging the integrator by $f_2$, reading, storing in memory 54.

2. In order to avoid a signal for return-to-zero ($R$=1) being transmitted on the appearance of the signal H before the integrator has been charged by the engaged tone frequency $f_o$ detected, the following precautions are taken, illustrated by the graph of FIG. 3, where V represents the voltage at the output of the integrator. The signal A is delayed by a few milliseconds (A') on its application at AND-circuit 22. Anticipating the charging of the integrator by the engaged tone frequency $f_o$ which has been detected, it is rapidly charged on the appearance of the signal A by the capacitor 109 which is kept charged with the voltage $V_o$. Immediately after the application of the voltage $V_o$ to the integrator, its output voltage decreases slightly, then rises again at the end of a few milliseconds when the frequency $f_o$ detected makes its effect felt. In this way, the voltage at the input of the threshold amplifier 119 remains above the reference voltage $V_r$ as long as set Y receives set X's transmission. Under these conditions a signal of logic value $\overline{R_2}$=1, that is to say a signal of return-to-zero $R_2$ is produced by the monostable multivibrator circuit 120.

If the operator of X hangs up his handset at the point of time $t$, abandoning the call without the operator of set having unhooked his handset, the output voltage of the integrator decreases as a result of the disappearance of the engaged tone frequency $f_o$; the level at the input of the threshold amplifier 119 passes below the reference voltage $V_r$: and a pulse is produced by the monostable multivibrator 120. This is the signal $\overline{R_2}$=O, i.e. $R_2$=1 which effects the return-to-zero of set Y.

3. The role of the memory 56 is to maintain the signal T' in case of a fluctuation of the level received which could cause the signal T' to disappear.

4. The signal A is accepted by the memory 53 only on majority decision after at least three agreeing decodings out of five have been received. The circuit affecting this operation is not shown in detail in FIG. 2, as there are several known methods for solving a problem of this nature.

5. The existence of the "supplementary modulation" of the frequency transmitted by the address code of the transmitting set makes it possible to check, by operating the call button 121, whether a party with whom one is trying vainly to get into communication is in conversation with a third party. In actual fact, since the decoder 72 in the set X of the calling party is programmed by the address code of Y, the called party, since Y emits its own address in the form of the supplementary modulation, X will be informed by the lighting up of its indicating device 122 if Y is effectively transmitting.

I have shown and described one embodiment in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are encompassed by the scope of the appended claims.

I claim:

1. A transceiver for use in a network in which individual transceivers are identified by unique codes and in which N-lines are available for carrying traffic between the transceivers on duplex radio links, the transceiver comprising a transmitter portion and a receiver portion, a variable coder selectively connectable to said transmitter portion for producing a code of a selected transceiver with which a duplex link is to be established; a fixed decoder connected to the output of said receiver portion for recognizing on an incoming signal a code representative of the transceiver identity; a frequency generator providing $N/2$ frequency pairs spaced by $N/2$ frequency ranges, the two frequency ranges of each pair characterizing two lines available to one duplex connection; a scanning device connecting the output of said frequency generator to the input of said receiver portion for conducting a step-by-step exploration of the frequency pairs, first means connected to the output of said receiver portion for checking the utilization of the two frequencies of a pair at each step of the exploration; and second means responsive to said first means for stopping the exploration if both of the two frequencies of a pair are available to establish a new duplex link.

2. A transceiver as claimed in claim 1, including line-engaged means selectively connected to the input of said transmitter portion for modulating outgoing transmission with a characteristic signal signifying that the frequency of transmission is in use.

3. A transceiver as claimed in claim 2, in which said line-engaged means modulates the transmission with a continuous audio frequency signal above the normal range of speech frequencies.

4. A transceiver as claimed in claim 3, wherein said first means includes circuitry responsive to the absence of said continuous audio frequency signal on a particular frequency to signify the availability of that frequency for duplex connection.

5. A transceiver as claimed in claim 1 wherein said transmitter portion includes a code modulator operated by the variable coder to impress on an outgoing transmission a code signal representative of the identity of a transceiver with which communication is to be established, the code modulator modulating the transmission in a different manner to the modulation employed for transmitting information through the established duplex connection.

6. A transceiver as claimed in claim 3, including comparator means connected to the receiver portion and to the variable coder for comparing an incoming reply code impressed on an incoming transmission with a code impressed by the coder on an outgoing transmission and representative of the identity of a transceiver with which communication is to be established.

7. A transceiver as claimed in claim 6, including means for connecting said line-engaged means to the transmitter portion for modulating the outgoing transmission with the characteristic signal in response to the detection of said characteristic signal on an incoming transmission at the other frequency of the frequency of the frequency pair selected.

8. A transceiver as claimed in claim 7, including a switching circuit which reverts the transceiver to its watching quiescent condition upon the disappearance of said characteristic signal modulating the incoming transmission.

9. A transceiver as claimed in claim 7 further including detecting means for detecting the presence of said characteristic signal on an incoming transmission including a narrow band filter selective to the frequency of the characteristic signal, an integrator responsive to the duration during which the characteristic signal is sustained, and a threshold amplifier responsive to the amplitude of the characteristic signal.

10. A transceiver as claimed in claim 9, in which said detecting means is connected to first memory means for storing values signifying that a pair of frequencies are free for establishing duplex connections, such values controlling operation of a timing signal generator, and a logic circuit influencing operation of the stepping device.

11. A transceiver as claimed in claim 9 including means for accelerating the charging of a charging circuit forming part of the integrator, such accelerated charging taking place at the commencement of reception and after a frequency pair for the establishment of duplex connections have been found.

12. A transceiver as claimed in claim 1, having a telephone handset provided with a rest position at which a member is operated to revert the transceiver to its quiescent watching state.

13. A transceiver as claimed in claim 12, including means for speeding the operation of the scanning device during periods that the handset is not in its rest position.

14. A transceiver as claimed in claim 1, including means for continuously impressing the code of the variable coder on the radiated transmission at a particular frequency for a duration not less than the time necessary for the scanning device to conduct a complete exploration of the frequency pairs.

15. A transceiver as claimed in claim 1 wherein said scanning device includes a prepositioned counter set to a finite number of occupied lines corresponding to saturation of the network and adapted to prevent further transmission after the exploration of the frequency pairs available signifies the network to be saturated.

16. A transceiver as claimed in claim 15, in which the counter includes means for releasing the stepping device for a fresh exploration of the frequency pairs a finite time after saturation has occurred.

17. A transceiver as claimed in claim 2 wherein said receiver portion includes a majority decision device inserted between a comparator receiving an incoming code, a local code and a memory.

* * * * *